3,050,555
ETHYLENE TELOMERS
George Van Dyke Tiers, St. Paul, Minn., assignor to Minnesota Mining and Manufacturing Company, St. Paul, Minn., a corporation of Delaware
No Drawing. Filed Sept. 19, 1958, Ser. No. 761,921
5 Claims. (Cl. 260—543)

The present invention relates to a new class of omega-chloroalkanesulfonyl fluorides and is a continuation-in-part of my copending application Serial No. 591,812, filed June 18, 1956, now abandoned.

The omega-chloroalkanesulfonyl fluorides of this invention are those corresponding to the structural formula $$Cl(CH_2CH_2)_nSO_2F$$

wherein $n$ is an integer from 2 to about 45. These compounds are a new class of ethylene telomers which have a remarkable variety of useful properties.

These compounds range in their normal physical state from free flowing liquids to oils, greases, waxes and powders. Many of these are useful raw materials in the electrofluorination process described in Brice and Trott Patent No. 2,732,398 and provide useful chemical intermediates in the synthesis of a wide variety of organic materials.

Thus, compounds forming the lower members of the series, namely those compounds where $n$ is from 2 to about 5, are free flowing easily handleable liquids readily converted to colorless disulfonamides, which are epoxy curing agents, upon reaction with disulfides and ammonia.

The intermediate and higher members of the series, namely those compounds where $n$ is from about 6 to about 45 vary from viscous liquids to solid compounds. They also form useful sulfonamides, and can be hydrolyzed to sulfonates, which are good detergents. The higher members of the series, namely those compounds wherein $n=10$ to about $n=45$, are useful lubricants, forming oils, greases and waxes.

The lowest member of the series, omega-chlorobutanesulfonyl fluoride, which corresponds to an $n$ value of 2 in the generic formula noted hereinbefore, is unique in that it readily cyclizes under the action of ammonia to form organic ring structures.

These compounds have been found to possess quite different properties from the heretofore known beta-chloroethanesulfonyl fluoride, $ClCH_2CH_2SO_2F$, which has been found to react violently with ammonia and fails to form even a chlorosulfonamide.

Also, these compounds are fundamentally different from alpha-chloro-substituted alkanesulfonyl fluorides wherein the chloro-substituent and the fluorosulfonyl group are borne by the same carbon atom, as the chlorine in the alpha position is extremely inert to removal or replacement without cleavage of the carbon to sulfur bond attaching the fluorosulfonyl group.

The fluorosulfonyl group in the novel omega-chloroalkanesulfonyl fluoride telomers of this invention is quite stable to sulfur-carbon bond cleavage even at elevated temperatures whereby this carbon to sulfur bond is enabled to survive treatments which may affect the chloro-substituent. This class of compounds, which provide different sites of selective reactivity, forms a highly desirable group of new and useful chemical building blocks affording a plurality of reactive sites which may be individually utilized at the same stage or in successive stages in the building of a variety of useful organic compounds.

The compounds of this invention can be readily prepared by the reaction of sulfuryl chloro-fluoride with ethylene in the presence of an initiator for free-radical polymerization as is more fully described in my copending application, S.N. 595,013, filed June 26, 1956, issued as Patent No. 2,846,472 on August 5, 1958. The telomerization reaction is illustrated by the equation following:

$$nCH_2=CH_2 + SO_2FCl \xrightarrow[\text{initiator}]{\text{Free-radical}} Cl(CH_2CH_2)_nSO_2F$$

The choice of initiator for free-radical polymerization is one of convenience for each particular synthesis. Suitable initiators are actinic radiation such as ultra violet light, organic peroxides or hydroperoxides, or aliphatic azo compounds. The utilization of this method in preparation of the telomers constituting this invention is illustrated by the following specific examples.

Example 1

Into a dry, chilled 180 ml. autoclave was placed 45 g. SO_2FCl and 4 g. ditertiary-butyl peroxide. Approximately 27 g. gaseous ethylene was pumped into the autoclave at room temperature (1:2.5 mole ratio SO_2FCl to ethylene) and the autoclave was sealed, then heated to 130° C. for approximately one-half hour. Thereafter, the temperature of the autoclave was maintained at about 100° C. for 14 hours. The autoclave was then cooled to room temperature and vented, 62 g. liquid product was recovered, which upon fractional distillation yielded the following identified fractions:

(1) 37.1 g. Cl $(C_2H_4)_2SO_2F$; B.P. 125° C., 20 mm. Hg; $n_D^{25}$ 1.4369. Calculated: percent Cl, 20.3; percent C, 27.5; percent F, 10.9. Found: percent Cl, 20.1; percent C, 27.7; percent F, 10.8.

(2) 11.8 g. Cl$(C_2H_4)_3SO_2F$; B.P. 154° C., 20 mm. Hg; $n_D^{25}$ 1.4410. Calculated: percent Cl, 17.5; percent C, 35.7; percent F, 9.4. Found: percent Cl, 17.5; percent C, 35.8; percent F, 9.3.

From another ethylene run carried out in a manner similar to the foregoing, there was obtained 3.2 g. of a fraction boiling at 75° C. at 20 mm. Hg, which was apparently a mixture of $ClC_2H_4SO_2F$ and $Cl(C_2H_4)_2SO_2F$ as indicated by the quantitative analysis of the fraction:

Calculated for $ClC_2H_4SO_2F$: percent Cl, 24.2; percent C, 16.4; percent F, 12.9. Found: percent Cl, 24.3; percent C, 20.5; percent F, 11.8.

Calculated for $Cl(C_2H_4)_2SO_2F$: percent Cl, 20.3; percent C, 27.7; percent F, 10.9.

Example 2

To a chilled 1000 ml. autoclave containing 200 ml. of benzene and a tertiary butyl peroxide telomerization initiator, was added 49 grams (.413 mole) of SO_2FCl in the form of a chilled liquid. Approximately 106 grams (3.79 moles), ethylene was added under pressure to the autoclave and the autoclave was then sealed.

The autoclave was then heated and the internal temperature measured. After 50 minutes the temperature rose to 15° C. and the pressure to 500 lbs. per square inch gauge; at the end of 3 hours and 3 minutes the temperature had risen to 137° C. and the pressure reached a maximum of 2300 lbs. per square inch gauge. Thereafter the temperature was raised slowly while the pressure diminished and at the end of 5 hours and 12 minutes with the temperature reading at 160° and the internal pressure at 1100 lbs. per square inch gauge, the autoclave was vented. No product loss occurred during the venting. Benzene was removed on a steam bath at low pressure and there was left on cooling a gel-like solid. This gel-like solid was then subjected to a one-plate distillation at low pressure to isolate the volatile materials from the solids. Thereafter the remaining volatile materials were fractionally distilled to provide the following products.

| Product | Weight In Grams | Wt. Percent of Total Charged | Moles of SO₂FCl | Moles Ethylene | Percent SO₂FCl | Conversion Ethylene |
|---|---|---|---|---|---|---|
| ClC₂H₄SO₂F | 4.78 | 5.6 | .033 | .033 | 8 | .9 |
| Cl(CH₂CH₂)₂SO₂F | 35.90 | 42.3 | .205 | .410 | 50 | 10.8 |
| Cl(CH₂CH₂)₃SO₂F | 23.46 | 27.6 | .116 | .348 | 28 | 9.2 |
| Cl(CH₂CH₂)₄SO₂F | 9.30 | 10.9 | .040 | .160 | 10 | 4.2 |
| Cl(CH₂CH₂)₅SO₂F | 4.8 | 5.6 | .019 | .093 | 4 | 2.5 |
| Residue | 6.80 | 8.0 |  |  |  |  |
| Total | 85 | 99.9 | .412 | 1.044 | 100 | 27.6 |

Ethylene/SO₂FCl molar ratio: Reactants, 9.2/1; products, 2.5/1.

The omega-chloro-octanesulfonyl fluoride and the omega-chloro-decanesulfonyl fluoride were liquid fractions having boiling points respectively of about 180° C. and about 200° C.

Example 3

This example discloses a procedure whereby the solid materials, the waxes, etc., may be formed as the predominant products of the reaction mixture.

In a metal liner chilled in liquid air were placed 16.5 grams of SO₂FCl (.139 mole) plus 20 ml. of benzene. Ten more ml. of benzene along with 2 grams of azo bis-isobutyronitrile were placed in a 180 ml. autoclave and the cold liner and contents introduced therewith. The autoclave was then sealed and filled with ethylene to an indicated pressure of between about 825 lbs. per square inch gauge and 875 lbs. per square inch gauge and over a period of about an hour the temperature of the autoclave was raised from 21° C. to 75° C. without agitating the autoclave. After the desired temperature of 75° C. was reached, agitation of the autoclave was begun to mix the material in the liner with the material in the autoclave. The mixing was exothermic and the temperature rose from 76° C. to 80° C. over the next 3 hours while the pressure fell from a maximum of about 1580 p.s.i.g., indicating the progress of the reaction. At the end of 4 hours the temperature of the autoclave was reduced to room temperature and vented slowly.

After the autoclave was vented, the product was removed and slurried in an excess of anhydrous ether. The resulting suspension was centrifuged, resuspended in ether and then centrifuged twice to separate the solids from the liquids. The liquid materials were then fractionally distilled as in the preceding examples. The solid contents were then divided into those which were soluble in ether and those which were not. The product distribution is given in the table below.

| Product | Weight In Grams | Wt. Percent of Total Charged | Moles of SO₂FCl | Moles Ethylene | Percent SO₂FCl | Conversion Ethylene |
|---|---|---|---|---|---|---|
| ClC₂H₄SO₂F | .33 | .5 | .002 | .002 |  |  |
| ClC₄H₈SO₂F | 15.94 | 26.0 | .091 | .182 | 65.5 | 9.0 |
| ClC₆H₁₂SO₂F | 3.96 | 6.5 | .020 | .060 | 14.4 | 2.1 |
| Solids: |  |  |  |  |  |  |
| A (ether soluble) | 12.9 | 21.0 | .030 | 1.7 | 21.6 | 61 |
| B | 28.1 | 46.0 |  |  |  |  |
| Total | 61.23 |  | .139 | 1.94 | 100 | 72.2 |

Ethylene/SO₂FCl molar ratio: Reactants, 20/1; products, 14/1.

The solid material A was a light tan, waxy solid having an indeterminate melting point. The solid material B was a dry, white powder having a melting point of about 110° C.

The analytical results for the solid materials A and B are set forth hereinbelow.

Calculated for Cl(CH₂CH₂)₂₀SO₂F: C, 70.8; Cl, 5.16; F, 2.8; S, 4.72; Cl(CH₂CH₂)₂₁SO₂F: C, 71.2; Cl, 4.97; F, 2.7; S, 4.54. Found—A: C, 70.8; Cl, 4.12; F, 2.8; S, 4.5.

Calculated for Cl(CH₂CH₂)₃₅SO₂F: C, 76.0; Cl, 3.21; S, 2.89; Cl(CH₂CH₂)₃₈SO₂F: C, 76.9; Cl, 3.00; S, 2.70; Cl(CH₂CH₂)₄₀SO₂F: C, 77.3; Cl, 2.86; S, 2.58. Found—B: C, 76.7; Cl, 2.76; S, 3.19.

Thus, A appears to be composed predominantly of Cl(CH₂CH₂)₂₀SO₂F and B appears to be composed predominantly of Cl(CH₂CH₂)₃₅₋₄₀SO₂F.

A large scale run to produce the more versatile lower members of the series where $n=2$ and 3 is illustrated by the following example.

Example 4

The procedure followed was to charge 0.5 lb. of benzoyl peroxide, dissolved in 8.0 lbs. of benzene, to a clean and dry 5 gallon, heavy wall stainless steel jacketed autoclave equipped with stirrer. The unit was equipped with the necessary charging lines, scales, vent, rupture assembly, manual temperature control, and draining and ventilating equipment necessary to carry out liquid-gas phase reactions under pressure. With this system, it was possible to add continuously at least one liquid and one gas stream. A dip tube allowed sampling and provided for continuous discharge. The entire installation was operated from behind a 12 inch concrete barricade.

This reaction vessel was then evacuated prior to pressuring with 4.0 lbs. of ethylene. After the ethylene addition, the contents were heated to 80–85° C. which resulted in pressure of 900 p.s.i.g. Six (6.0) lbs. of SO₂FCl were then metered into the reactor over a 90 minute period while maintaining a reaction temperature of 80–85° C. and a reaction pressure of 850–900 p.s.i.g. (by adding ethylene as necessary). In all, 6.6 lbs. of ethylene were used. One (1.0) lb. of benzene was pumped through the charging lines for flushing. The contents were then cooled and the reactor was slowly vented to the atmosphere. With a nitrogen sweep, the contents were reheated to 130° C. for 30 minutes to remove unreacted materials and destroy any remaining peroxide. On draining the reactor, 15.6 lbs. were recovered, which, by analytical distillation of an aliquot portion, gave the following compound distribution.

|  | Lbs. | Lbs. Mol | SO₂FCl, percent | Conv. |
|---|---|---|---|---|
| I. Cl(CH₂CH₂)₂SO₂F | 6.48 | 0.0372 | 84 | 7.8 I/II |
| II. Cl(CH₂CH₂)₃SO₂F | 0.97 | 0.0048 | 10 |  |

The following example sets forth the conversion of omega-chlorobutanesulfonyl fluoride to a disulfide-disulfonamide.

*Example 5*

Seven grams of omega-chlorobutanesulfonyl fluoride, $Cl(CH_2CH_2)_2SO_2F$, was stirred vigorously with 20 ml. of 30% aqueous $NH_3$ (ca. 0.30 mole), with warming to a temperature of between 50 and 70° C. After about ½ hour all of the organic phase had dissolved in the aqueous phase and by means of moderate evacuation and warming, excess unreacted $NH_3$ was removed, and the pH of the solution reduced to 6.5–7.0 A second phase appeared, as the low-melting sulfonamide is not very soluble in neutral or acidic aqueous media. To this mixture was added 10.0 ml. of a freshly prepared 2:1 molar aqueous solution of $Na_2S_2$ (105% of the theoretical amount). Upon this addition the second phase dissolved and on warming for about 15 minutes, a copious white precipitate was deposited from the bright yellow solution. This precipitate was filtered off, washed to remove salts and unreacted material, and dried to a constant weight in a 70–80° C. oven. There was obtained 4.44 g. of colorless disulfonamide having the structure

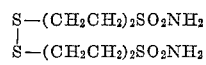

This resulting disulfide-disulfonamide was used to cure an epoxy resin by mixing a stoichiometric quantity of this material with an epoxy resin containing a trace of N,N-dimethylbenzylamine catalyst and heating for 2 hours at 155° C. in a suitable vessel. The mixture reacted rapidly and cured to a dark amber colored cross-linked resin, stiff at the curing temperatures and hard and somewhat brittle at room temperatures. Use of purified samples of disulfide-disulfonamides resulted in less brittle cured products of light amber color. The epoxy resin used was "Epon 828" a resin product of the reaction of epichlorhydrin and bisphenol marketed by Shell Chemical Corp.

Attempts to convert $ClCH_2CH_2SO_2F$ to a disulfide-disulfonamide were unsuccessful. When ammonia was added to this material a violent reaction took place with a spontaneous temperature rise to 60–70° C. and formation of chloride ion after which no organic phase remained in the mixture. The addition of $Na_2S_2$ solution and further warming yielded no more than a thin, powdery precipitate composed essentially of elemental sulphur.

*Example 6*

This example illustrates the preparation of 1,4-butanesultam.

A mixture of 28 parts of ethylene, 43 parts of sulfuryl chlorofluoride, 2 parts of azobisisobutyronitrile and 20 parts of benzene is heated in an autoclave at about 80° C. under 1000 p.s.i. pressure for about 2 hours. The reaction mixture is then fractionally distilled at 10 mm. Hg pressure yielding 4-chlorobutanesulfonyl fluoride as the fraction boiling at about 110° C.

A mixture of 52.7 parts of 4-chlorobutanesulfonyl fluoride and 400 parts of 20 percent aqueous ammonium hydroxide is heated at 35° to 40° C. for about 4 hours with good agitation, followed by rapid evaporation under reduced pressure, whereby a residue, melting at about 40° C., consisting mainly of 4-chlorobutanesulfonamide, M.P. about 50° C. and some 1,4-butanesultam, M.P. about 111° C. is obtained. The products can be separated by crystallization or by fractional distillation below 1 mm. Hg pressure, if desired.

A vessel adapted for heating and agitation is charged with 500 parts of 2 percent aqueous sodium hydroxide and 21.2 parts of 4-chlorobutanesulfonamide are added and dissolved therein. The solution is heated at about 50° C. for 17 hours and then evaporated under reduced pressure to about 5 to 10 percent of its original volume. The concentrated solution is treated with an excess of carbon dioxide to neutralize any remaining base and then is evaporated to dryness. The residual white cake is broken up and extracted in three successive extractions with 150 part portions of isopropanol, the insoluble residue being discarded after the last extraction. The total extract is concentrated to small volume and chilled. A crystalline precipitate of 1,4-butanesultam forms on standing and is collected as by filtration and dried. The mother liquors are further evaporated and chilled, and the precipitate recovered. This process is repeated and the crystalline materials obtained from all of the crystallizations are combined. The yield of 1,4-butanesultam is substantially quantitative. It is found that both the ammoniation reaction of the sulfonyl fluoride and the ring closure of the chlorosulfonamide proceed more satisfactorily with respect to yield and purity at relatively low concentrations of alkali as herein described.

The higher telomers wherein $n$ has values between about 4 and about 40 form useful detergents, being convertible into the omega-chlorosulfonamides by the ammoniation procedures noted hereinbefore and being readily hydrolyzed thereafter to the detergent sulfonates in the presence of a base such as sodium hydroxide.

The lower members of the series, wherein $n=2$ and 3 are the preferred compounds of this invention. They are obtained in high yield and in a relatively pure state and are the more reactive members of the series.

What is claimed is:

1. A compound corresponding to the formula $$Cl(CH_2CH_2)_nSO_2F$$

wherein $n$ is an integer having a value of from 2 to 45.

2. A compound corresponding to the formula $$Cl(CH_2CH_2)_nSO_2F$$

wherein $n$ is an integer of from 2 to 5.

3. As a compound, omega-chlorobutanesulfonyl fluoride.

4. As a compound, omega-chlorohexanesulfonyl fluoride.

5. A compound corresponding to the formula $$Cl(CH_2CH_2)_nSO_2F$$

wherein $n$ is an integer from 2 to 3.

References Cited in the file of this patent

UNITED STATES PATENTS

| | | |
|---|---|---|
| 2,276,097 | Salzberg | Mar. 10, 1942 |
| 2,742,474 | Mahan | Apr. 17, 1956 |
| 2,783,275 | Scherer | Feb. 26, 1957 |
| 2,846,472 | Tiers | Aug. 5, 1958 |
| 2,895,958 | Friedlander | July 21, 1959 |